US008074062B2

(12) United States Patent
Yang et al.

(10) Patent No.: US 8,074,062 B2
(45) Date of Patent: Dec. 6, 2011

(54) METHOD AND SYSTEM FOR USING A SERVER MANAGEMENT PROGRAM FOR AN ERROR CONFIGURATION TABLE

(75) Inventors: Chih-Cheng Yang, Taipei (TW); Yung Shun Liang, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 659 days.

(21) Appl. No.: 12/228,239

(22) Filed: Aug. 11, 2008

(65) Prior Publication Data

US 2010/0037044 A1 Feb. 11, 2010

(51) Int. Cl.
*G06F 9/00* (2006.01)
*G06F 1/24* (2006.01)

(52) U.S. Cl. ............................. 713/1; 714/47.2; 713/100

(58) Field of Classification Search ............... 713/1, 100; 714/47.2
See application file for complete search history.

(56) References Cited

U.S. PATENT DOCUMENTS

| | | | |
|---|---|---|---|
| 6,134,676 A | 10/2000 | VanHuben et al. | |
| 6,496,790 B1 * | 12/2002 | Kathavate et al. | 702/188 |
| 6,598,179 B1 * | 7/2003 | Chirashnya et al. | 714/37 |
| 7,188,171 B2 | 3/2007 | Srinivasan et al. | |
| 7,308,610 B2 | 12/2007 | Kuramkote et al. | |
| 7,315,962 B2 | 1/2008 | Neuman et al. | |
| 2005/0060526 A1 * | 3/2005 | Rothman et al. | 713/1 |
| 2006/0253740 A1 | 11/2006 | Ritz et al. | |
| 2008/0126779 A1 | 5/2008 | Smith | |
| 2008/0141077 A1 * | 6/2008 | Swanson et al. | 714/48 |
| 2008/0168310 A1 | 7/2008 | Saretto et al. | |
| 2009/0132800 A1 * | 5/2009 | Shih et al. | 713/100 |

OTHER PUBLICATIONS

Windows, "Windows Hardware Error Architecture", Microsoft Corporation, May 25, 2006, Printed From Internet May 17, 2007, 2 pgs.
Windows, "MCA Support in 64-bit Windows", Microsoft Corporation, Jun. 18, 2003, Printed From Internet May 17, 2007, 8 pgs.
Strange et al., "Error Management Solutions Synergy With WHEA", Microsoft, 2005, Printed From Internet Jul. 29, 2008, 33 pgs.
Copending Application, Yang et al., "System And Method For Information Handling System Error Handling", Apr. 16, 2007, U.S. Appl. No. 11/735,531, 15 pgs.
Copending Application, Nijhawan et al., "Modifying Node Descriptors To Reflect Memory Migration In An Information Handling System With Non-Uniform Memory Access", Mar. 10, 2006, U.S. Appl. No. 11/372,569, 35 pgs.
Nguyen T. Long, "[Patch 1/6] PCI Express Advanced Error Reporting Driver", Mar. 11, 2005, Printed From Internet May 17, 2007, 14 pgs.
Strange, Error Management Solutions Synergy with WHEA, WHEA Overview:, Microsoft Corporation, 2005, 26 pgs.

\* cited by examiner

*Primary Examiner* — Thomas Lee
*Assistant Examiner* — Terrell Johnson
(74) *Attorney, Agent, or Firm* — O'Keefe, Egan, Peterman & Enders LLP

(57) ABSTRACT

Methods and systems are disclosed for using a server management program for an error configuration table, wherein a user loads the management program, which receives a Hardware Error Configuration Table (HECT) from baseboard management controller (BMC) firmware, the HECT table containing error control parameters for a hardware error event table. A replica of the HECT is maintained in SRAM using BMC firmware. The HECT is sent via the basic input output system (BIOS) during system power up. An interface is set up to allow the user to configure error event thresholds. The user can set preferred threshold of a system management requirement without rebooting system. If the user makes changes to the HECT, the management program sends the new HECT to BMC firmware to feedback the completion. A software SMI is issued to inform BIOS of HECT changes during the BMC completion. BIOS informs the operating system (OS) to discard and reload the new HECT.

8 Claims, 6 Drawing Sheets

METHOD AND SYSTEM FOR USING A SERVER MANAGEMENT PROGRAM FOR AN ERROR CONFIGURATION TABLE

TECHNICAL FIELD

The techniques described herein relate to a method and system for using a server management program for an error configuration table, and particularly to making changes to a hardware error configuration table without rebooting the system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current information handling systems run through considerable initialization code stored in a basic input output system (BIOS) when a computer is powered on and boots up. Coordination of component operations is typically performed with the BIOS and an operating system, such as WINDOWS. The system sends a primary central processing unit (CPU), which is a pre-designated boot strap processor (BSP), an INIT-SIPI command for initialization, at which time the BSP begins running the BIOS software code. During the boot process, the BIOS typically discovers, maps, and initializes all the processors in a system. The various component operations typically include error handling functions that manage errors that arise during operations. Correctable errors can be corrected and uncorrectable errors may be classified as fatal or non-fatal errors. Hardware error handling systems may include variable and fixed threshold limits for identification and classification of a hardware error event. Typically to make changes to the tables that contain such, a system reboot is required. Thus, making such changes requires the time, complexity and down time of a system reboot.

For example, current art methods, such as a single bit error-correction coding (ECC) handling, for example, have a fixed threshold which is usually set for Dual Inline Memory Module (DIMM) fatal error prediction. Some methods address the requirement of variable threshold and provide an interface in a basic input output system (BIOS) setup to configure the threshold value which is a time setting and requires system reboot. PCI-Express fatal error prediction also requires variable threshold to enrich functionality. Many other hardware events may have threshold limits that it would be desirable to change, and the disclosure provided herein in not limited to these exemplary error events.

A baseboard management controller (BMC) is a specialized microcontroller embedded on a motherboard of a computer or server. The BMC is the intelligence in the Intelligent Platform Management Interface (IPMI) architecture, which defines a set of common interfaces to computer hardware and firmware that system administrators can use to monitor system health and manage the system. The BMC manages the interface between system management software and platform hardware. What is needed is a method of using a server management program for an error configuration table, wherein changes can be made to a hardware error configuration table without rebooting the system

SUMMARY

The techniques described herein provide a method and system for using a server management program for an error configuration table by loading the management program, wherein the management program receives a hardware error configuration table (HECT) from the BMC, the HECT table containing error control parameters for a hardware error event table. A replica of a HECT table is maintained in SRAM using BMC firmware. The HECT table is sent by a basic input output system (BIOS) during system power up. An interface is set up to allow a user to configure error event thresholds, wherein the user can set preferred threshold of a system management requirement without rebooting the system.

Another aspect of the techniques described herein provide an information handling system having a basic input output system (BIOS), comprising a central processing unit (CPU) configured for using a server management program for an error configuration table by loading the management program, wherein the management program receives a hardware error configuration table (HECT) from the BMC, the HECT table containing error control parameters for a hardware error event table. A replica of a HECT table is maintained in SRAM using BMC firmware. The HECT table is sent by a basic input output system (BIOS) during system power up. An interface is set up to allow a user to configure error event thresholds, wherein the user can set preferred threshold of a system management requirement without rebooting the system. As described below, other features and variations can be implemented, if desired, and a related method can be utilized, as well.

DESCRIPTION OF THE DRAWINGS

It is noted that the appended drawings illustrate only exemplary embodiments of the techniques described herein and are, therefore, not to be considered limiting of its scope, for the techniques may admit to other equally effective embodiments.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The techniques described herein relate to a method and system for using a server management program for an error configuration table, and particularly to making changes to a hardware error configuration table without rebooting the system.

Figure 1A:
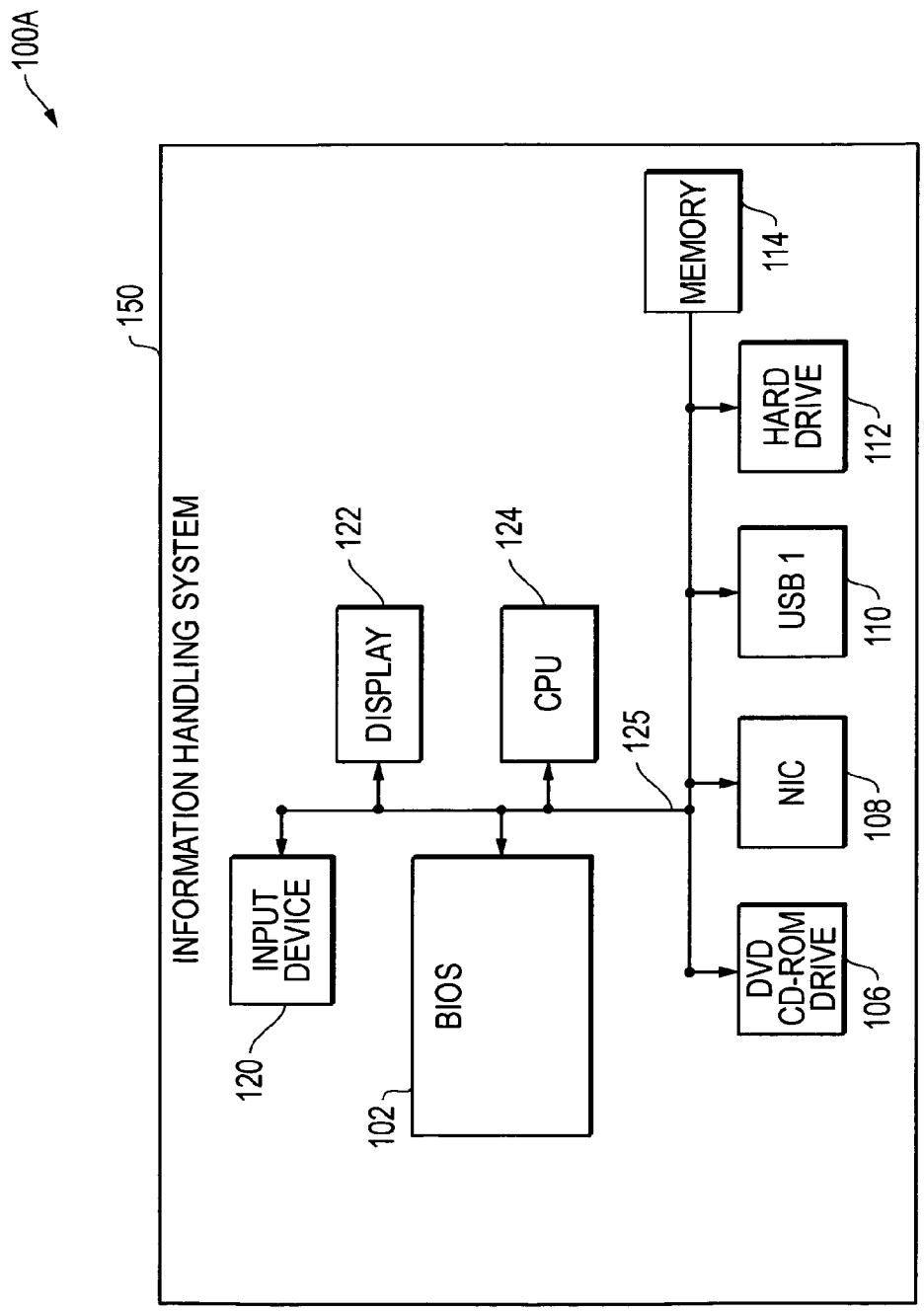
FIG. 1A is a block diagram for an information handling system according to the techniques described herein.
Figure 1B:
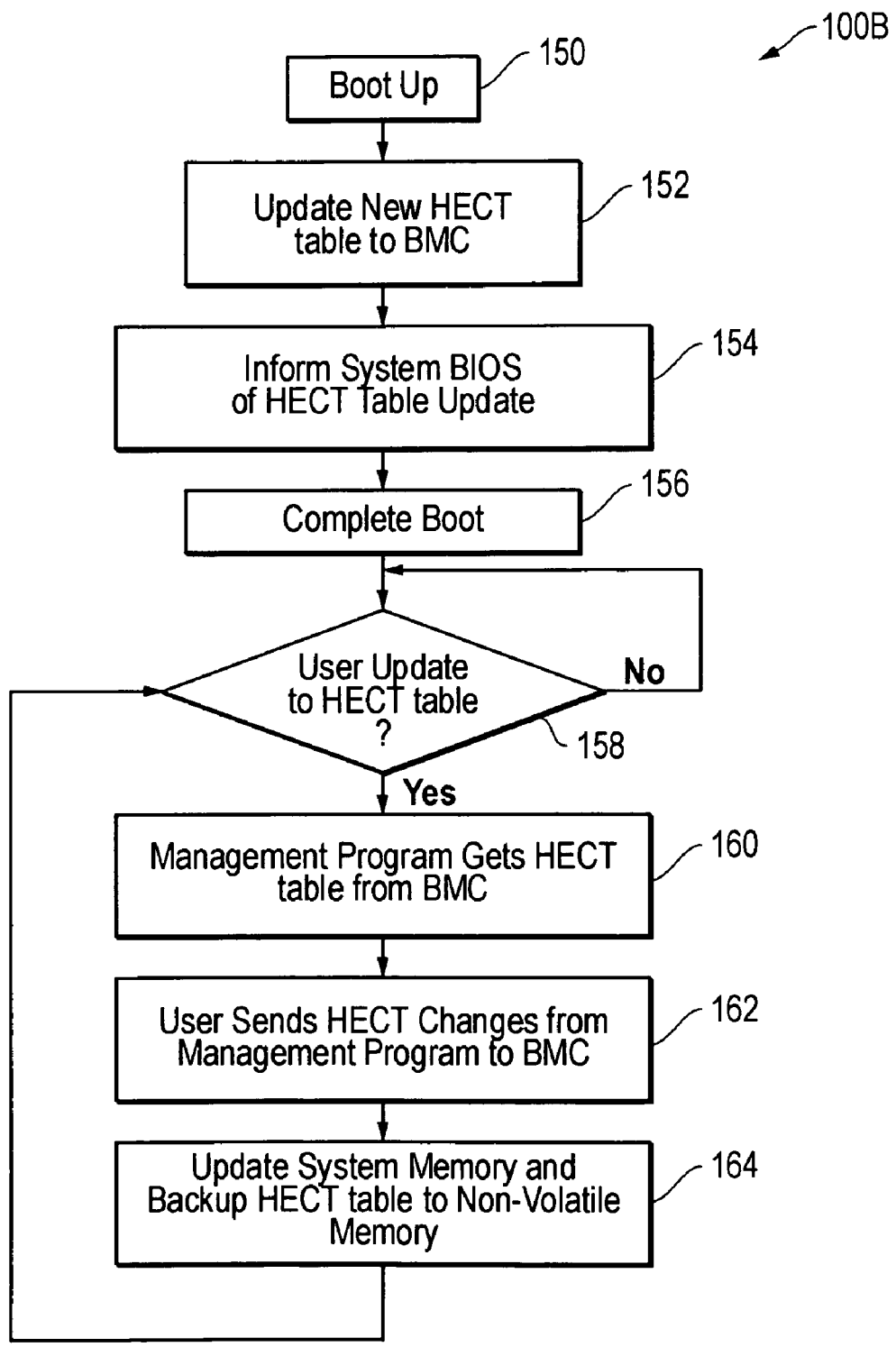
FIG. 1B is a flowchart of general steps involved in using a server management program for an error configuration table.
Figure 2:
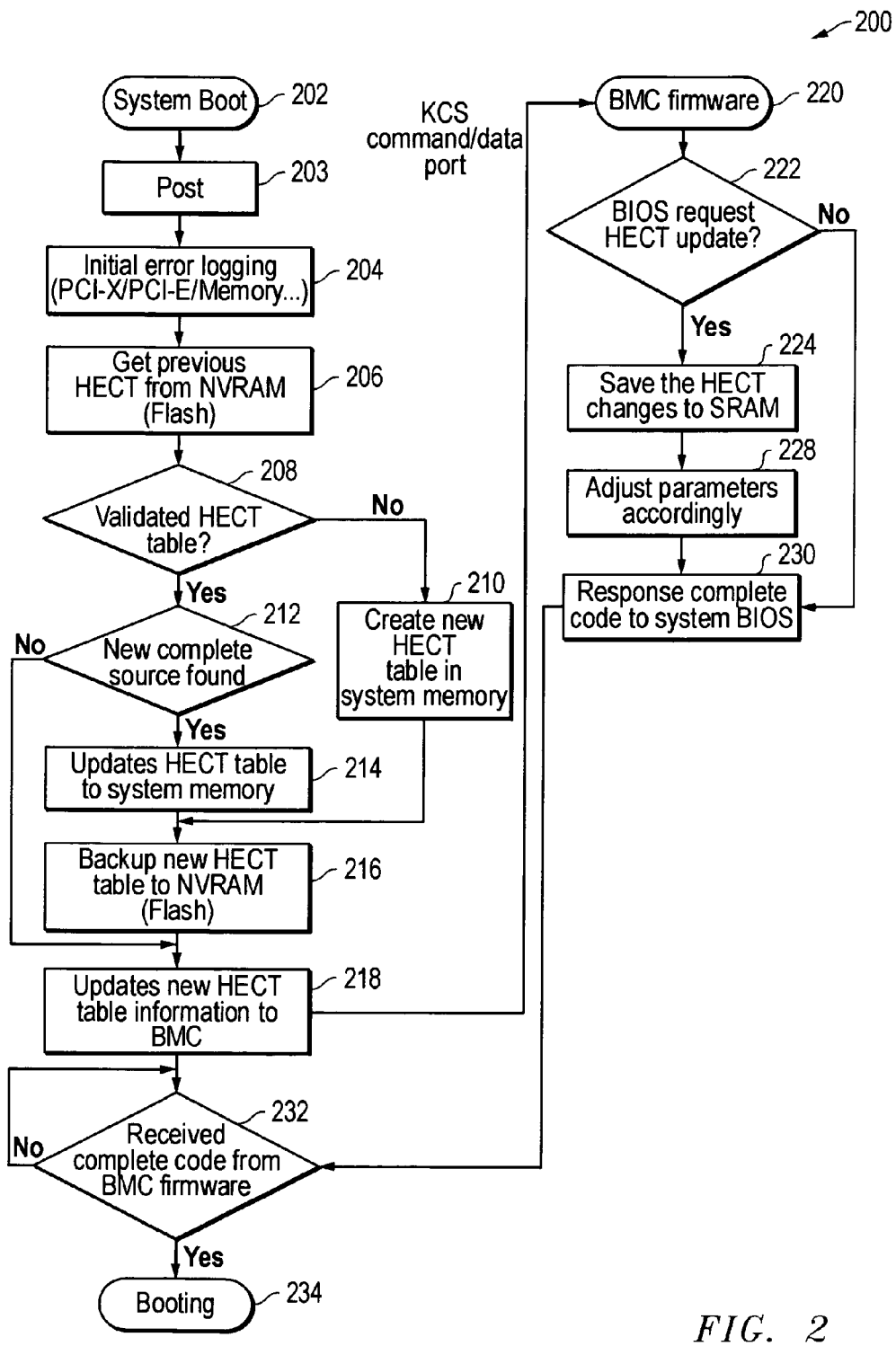
FIG. 2 is a flowchart of a basic input output system (BIOS) power-on self test (POST) flow of hardware error configuration table (HECT) handling.
Figure 3:
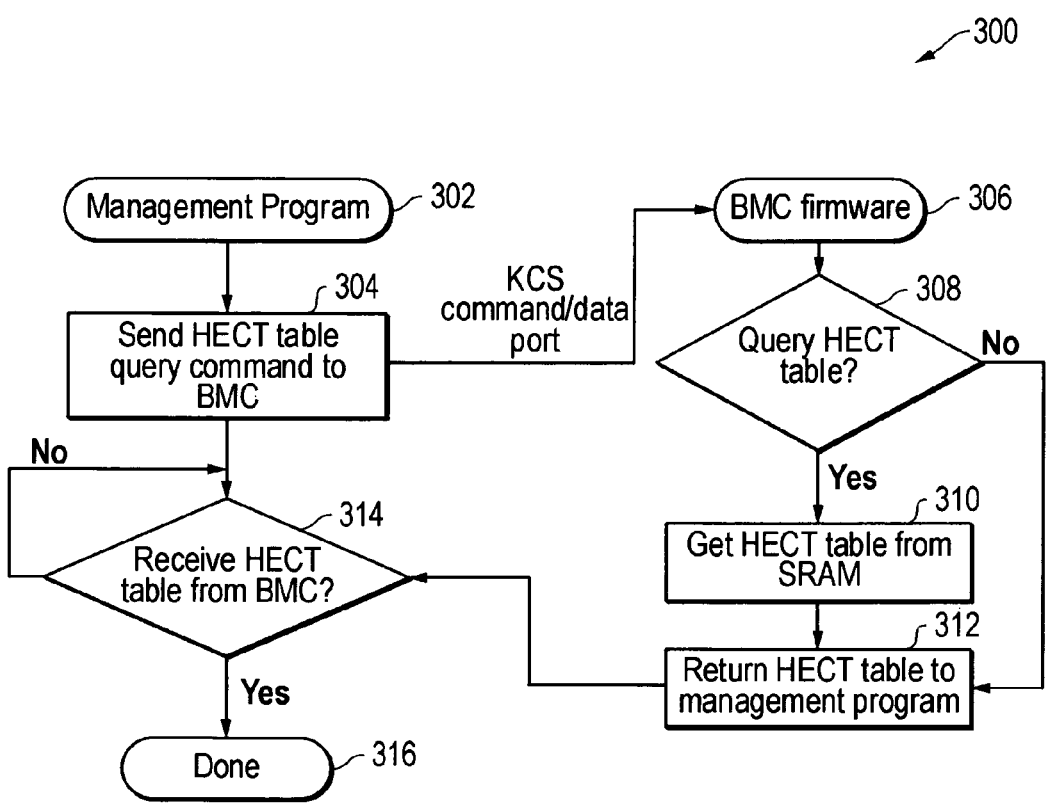
FIG. 3 is a flowchart of a management program acquiring HECT information with BMC firmware.
Figure 4A:
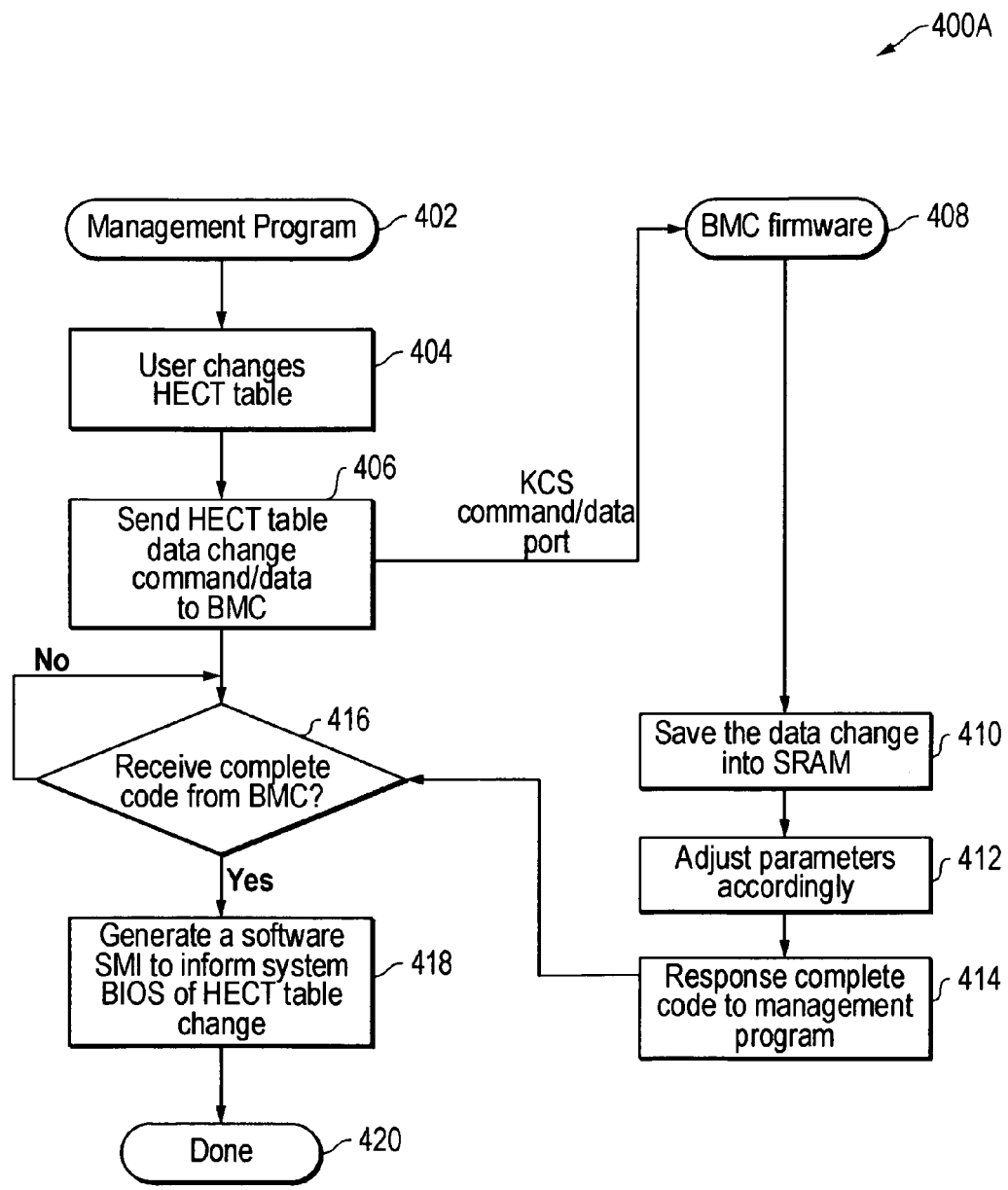
FIG. 4A is a flowchart of the management program updating HECT change information to BMC firmware.
Figure 4B:
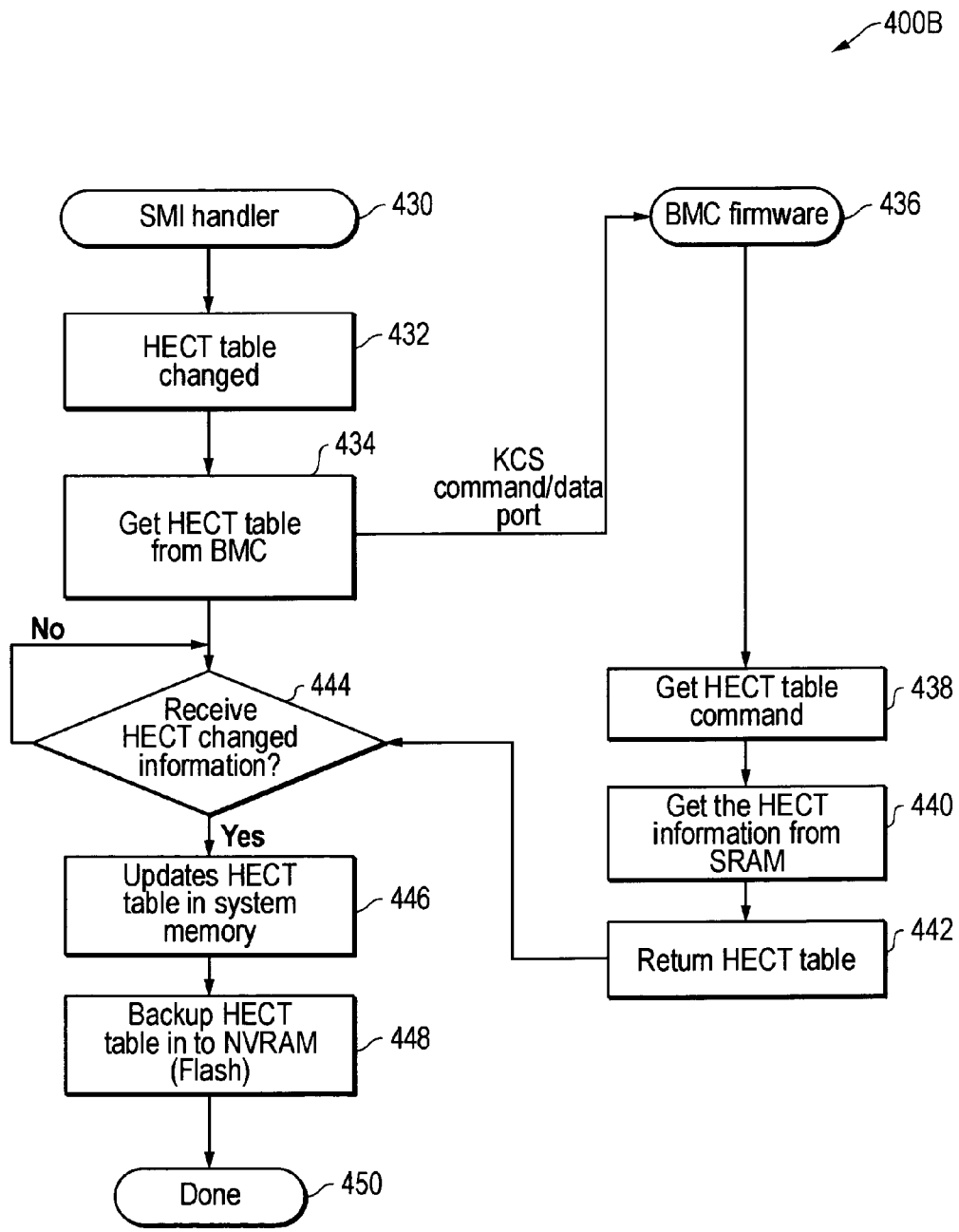
FIG. 4B is a flowchart of BIOS updating HECT information from BMC firmware.

Example embodiments for the techniques described herein will now be discussed with respect to the drawings. FIG. 1A provides a block diagram of an information handling system configured for using a server management program for an error configuration table, and more particularly to making changes to a hardware error configuration table without rebooting the system. FIG. 1B provides a general overview of using a server management program for an error configuration table. FIG. 2 provides an example process flow diagram for basic input output system (BIOS) power-on self test (POST) flow of HECT handling, according to the techniques described herein. FIG. 3 provides an example process flow diagram of management program acquiring HECT information with BMC firmware, according to the techniques described herein. FIG. 4A provides an example process flow diagram of management program updating HECT change information to BMC firmware, and FIG. 4B provides an example process flow diagram of BIOS updating HECT information from BMC firmware, according to the techniques described herein.

FIG. 1A is a block diagram 100A for an information handling system 150 according to the techniques described herein. In the embodiment depicted, the information handling system 150 includes a central processing unit (CPU) 124, BIOS (basic input output system) 102, an input device 120 and a display 122. In addition, the information handling system 150 includes a number of devices that could potentially be used to boot the system. These devices include CDROM drive 106, network interface card (NIC) 108, a first USB (universal serial bus) drive (USB 1) 110, hard drive 112, and memory 114. Interconnection 125 connects the devices and the other blocks within the information handling system 150 and represents one or more busses and related connection circuitry that allows communications among these elements of the information handling system 150.

The BIOS 102 is in communication with the CPU 124, wherein the BIOS 102 is configured to operate during initialization of the information handling system to use a management program for an error configuration table. The management program is loaded, wherein the management program receives a hardware error configuration table (HECT) from BMC. A replica of the HECT table is maintained in SRAM using BMC firmware, the HECT table being sent by the BIOS 102 during system power up. An interface is set up to allow a user to configure, wherein the user can set preferred threshold of a system management requirement without rebooting the system. For example, the user can also set a preferred threshold of DIMM reliability measuring without rebooting the system. Likewise, PCI-Express fatal error prediction thresholds may be set. Many other hardware events may have threshold limits that it would be desirable to change, and the disclosure provided herein in not limited to these exemplary error events.

FIG. 1B is a flowchart 100B of the general steps involved in using a management program for an error configuration table. The process begins when the system is booted up, step 150. A new hardware error configuration table (HECT) is updated to BMC, step 152. The new HECT table can be backed up to NVRAM or Flash. The system BIOS is informed of the HECT table update, step 154, then the booting process is completed, step 156. At this point, a user can make changes to the HECT table. HECT table changes can be saved to SRAM. A determination is made regarding whether a user has updated the HECT table, step 158. If No, the process returns to the determination step 158 to wait for the user to update the HECT table. If Yes, a management program receives the HECT table from BMC, step 160. The management program can receive the HECT table from SRAM at the BMC. A software SMI can be generated to inform the system BIOS of HECT table changes. The user sends the HECT table changes from the management program to BMC, step 162. System memory is updated and the HECT table is backed up to non-volatile memory, step 164, then the process returns to the determination step 158 to wait for the user to update the HECT table further.

FIG. 2 is a flowchart 200 of the BIOS POST flow of HECT handling. The process begins when the system boots, step 202. After power-on self test (POST), step 203, which is a pre-boot sequence, initial error logging, step 204, occurs. Then, the previous configuration table is retrieved from NVRAM or Flash, step 206. A determination is made regarding whether the HECT table is validated, step 208. If Yes, a determination is made regarding whether a new component is found, step 212. If Yes, the HECT table is updated to system memory, step 214, and the new HECT table is backed up to NVRAM or Flash, step 216. If No, a new error source is not found, then the new HECT table information is updated to BMC firmware, step 218.

Returning to the determination in step 208, if No, the HECT table is not validated, then a new HECT is loaded in system memory, step 210, by copying from the error source table. Then, the new HECT table is backed up to NVRAM or Flash, step 216, and the new HECT table information is updated to BMC firmware, step 218.

The process continues from step 218, via a KCS command/data port to BMC firmware 220, wherein a determination is made regarding whether BIOS has requested HECT update, step 222. If Yes, HECT changes are saved to SRAM, step 224, then parameters are adjusted accordingly, step 228, and response error code is sent to system BIOS, step 230. It is understood that a replica of HECT is maintained in SRAM using BMC firmware, the HECT being sent by a basic input output system (BIOS) during system power up. If No at step 228, BIOS has not requested HECT update, then the process skips to a step wherein response complete code is sent to system BIOS, step 230. Then, a determination is made regarding whether complete code is received from BMC firmware, step 232. If No, the complete code has not been received from the BMC firmware, the process repeats the determination step 232, regarding whether complete code is received from BMC firmware. If Yes, the process boots, step 234.

FIG. 3 is a flowchart 300 of a management program acquiring HECT information with BMC firmware. The process begins with a management program, step 302 sending HECT table query command to BMC, step 304 via KCS command/data port. The HECT table is queried, step 308, using BMC firmware, step 306. HECT table is retrieved from SRAM, step 310, then the HECT table is returned to the management program, step 312. A determination is made regarding whether the HECT table is received from BMC, step 314. If Yes, the process ends, step 316. If No, the process repeats the step 314, of determining whether the HECT table is received from BMC.

FIG. 4A is a flowchart 400A of a management program updating HECT change information to the BMC firmware. The process begins with a management program, step 402, wherein user changes are made to a HECT table, step 404. The HECT table data changes command/data are sent to BMC, step 406, via KCS command/data port, and are received in BMC firmware, step 408. Then, the data changes are saved into SRAM, step 410. Parameters are adjusted accordingly, step 412, and response complete code is sent to management program, step 414. A determination is made regarding whether complete code is received from BMC, step 416. If No, the determination step is repeated regarding whether complete code is received from BMC, step 416. If Yes, a software SMI is generated to inform system BIOS of HECT table changes, step 418, and the process ends, step 420.

FIG. 4B is a flowchart 400B of BIOS updating HECT information from BMC firmware. The process begins in SMI handler, step 430, when HECT table is changed, step 432. The HECT table is received from BMC, step 434, via a KCS command/data port, step 436. The HECT table command is received in BMC firmware, step 438. The HECT information is received from SRAM, step 440. The HECT table is returned, step 442. Then, a determination is made regarding whether the HECT change information is received, step 444. If No, the determination step is repeated regarding whether the HECT change information is received, step 444. If Yes, the HECT table is updated in system memory, step 446, and the HECT table is backed up into NVRAM or Flash, step 448, and the process ends by exiting SMI, step 450.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for using a server management program for an error configuration table, comprising:
    commencing booting of a system;
    retrieving a previous configuration table;
    checking a validation of a hardware error configuration table (HECT), wherein said hardware error configuration table (HECT) contains error control parameters for a hardware error event table for utilization during the boot process of the system;
    updating the hardware error configuration table (HECT) to system memory to provide an updated hardware error configuration table (HECT) if the hardware error configuration table is validated;
    backing up a new hardware error configuration table (HECT), the new hardware error configuration table (HECT) being either the updated hardware configuration table (HECT) or another newly created hardware error configuration table (HECT);
    updating the new hardware error configuration table (HECT) information to a baseboard management controller;
    saving hardware error configuration table (HECT) changes;
    adjusting parameters accordingly;
    sending hardware error configuration table (HECT) changes to system BIOS; and
    receiving hardware error configuration table (HECT) changes from baseboard management controller firmware; and
    setting a preferred threshold of a boot process system management requirement by a user without rebooting the system.

2. The method of claim 1, further comprising creating the new hardware error configuration table (HECT) in system memory if the hardware error configuration table (HECT) is not validated in the checking a validation step.

3. The method of claim 1, wherein the new hardware error configuration table (HECT) information is updated to a baseboard management controller via a KCS command/data port.

4. A method for using a computing system management program with an error configuration table, comprising:
    starting the booting up of a computing system;
    updating a new hardware error configuration table (HECT) to a baseboard management controller, wherein said hardware error configuration table (HECT) contains error control parameters for a hardware error event table the hardware error configuration table (HECT) being utilization during the boot process of the system;
    informing system BIOS of the hardware error configuration table (HECT) update;
    completing booting process;
    updating the hardware error configuration table (HECT) by a user;
    receiving the hardware error configuration table (HECT) by a management program from a the baseboard management controller;
    sending hardware error configuration table (HECT) changes by a user from the management program to the baseboard management controller; and
    updating system memory to back up the hardware error configuration table (HECT) to non-volatile memory.

5. The method of claim 4, wherein the new hardware error configuration table (HECT) is backed up to NVRAM.

6. The method of claim 5, wherein hardware error configuration table (HECT) changes are saved to SRAM.

7. The method of claim 6, wherein the management program receives the hardware error configuration table (HECT) from SRAM at the baseboard management controller.

8. The method of claim 7, wherein a software SMI is generated to inform the system BIOS of hardware error configuration table (HECT) changes.

* * * * *